(12) United States Patent
Fellers (10) Patent No.: US 10,410,644 B2
(45) Date of Patent: Sep. 10, 2019

(54) REDUCED COMPLEXITY TRANSFORM FOR A LOW-FREQUENCY-EFFECTS CHANNEL

(75) Inventor: Matthew C. Fellers, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 195 days.

(21) Appl. No.: 14/005,924

(22) PCT Filed: Mar. 19, 2012

(86) PCT No.: PCT/US2012/029603
§ 371 (c)(1),
(2), (4) Date: Sep. 18, 2013

(87) PCT Pub. No.: WO2012/134851
PCT Pub. Date: Oct. 4, 2012

(65) Prior Publication Data
US 2014/0012588 A1   Jan. 9, 2014

Related U.S. Application Data (60) Provisional application No. 61/468,373, filed on Mar. 28, 2011.

(51) Int. Cl.
*G10L 19/02*   (2013.01)
*G06F 17/14*   (2006.01)
*G10L 19/008*   (2013.01)

(52) U.S. Cl.
CPC ............ *G10L 19/02* (2013.01); *G06F 17/147* (2013.01); *G10L 19/0212* (2013.01); *G10L 19/008* (2013.01)

(58) Field of Classification Search
USPC .................................................. 704/204, 205
See application file for complete search history.

(56) References Cited

U.S. PATENT DOCUMENTS 2,888,554 A   5/1959   Hansell
3,900,721 A   8/1975   Speiser
(Continued)

FOREIGN PATENT DOCUMENTS

CN   1914669   2/2007
EP   1121754   7/2007
(Continued)

OTHER PUBLICATIONS

Dhabal, S. et al "A Novel Low Complexity Multichannel Cosine Modulated Filter Bank Using IFIR Technique for Nearly Perfect Reconstruction", 2012 1st International Conference on Recent Advances in Information Technology, Mar. 15-17, 2012, pp. 208-213.

(Continued)

*Primary Examiner* — Leonard Saint Cyr (57) ABSTRACT

The computational resources that are needed to apply a transform-based filterbank to a limited-bandwidth audio signals are reduced by performing an integrated process of combining real-valued input data into complex-valued data and applying a short transform to the complex-valued data, applying a bank of very short transforms to the output of the integrated process, and deriving a sequence of real-valued output data from the outputs of the bank of very short transforms.

16 Claims, 3 Drawing Sheets

(56) References Cited

U.S. PATENT DOCUMENTS

| | | |
|---|---|---|
| 4,241,411 A | 12/1980 | Krasner |
| 4,579,032 A | 4/1986 | Deutsch |
| 5,394,349 A | 2/1995 | Eddy |
| 5,671,168 A | 9/1997 | Liu |
| 5,781,728 A | 7/1998 | Rybicki |
| 5,841,890 A | 11/1998 | Kraske |
| 5,978,646 A | 11/1999 | Weinberg |
| 5,978,647 A | 11/1999 | Weinberg |
| 5,983,067 A | 11/1999 | Weinberg |
| 5,995,803 A | 11/1999 | Weinberg |
| 6,002,914 A | 12/1999 | Weinberg |
| 6,081,783 A | 6/2000 | Divine |
| 6,263,312 B1 | 7/2001 | Kolesnik |
| 6,356,870 B1 | 3/2002 | Hui |
| 6,430,529 B1 | 8/2002 | Huang |
| 6,477,553 B1 | 11/2002 | Druck |
| 6,526,099 B1 | 2/2003 | Christopoulos |
| 6,643,406 B1 | 11/2003 | Hajjahmad |
| 6,768,517 B2 | 7/2004 | Limberg |
| 6,776,760 B2 | 8/2004 | Marmarelis |
| 6,850,589 B2 | 2/2005 | Heumann |
| 6,993,547 B2 | 1/2006 | Jaber |
| 7,231,303 B2 | 6/2007 | Griessler |
| 7,246,143 B2 | 7/2007 | Hu |
| 7,272,265 B2 | 9/2007 | Kouri |
| 7,277,493 B2 | 10/2007 | Lai |
| 7,366,236 B1 | 4/2008 | Winger |
| 7,483,480 B2 | 1/2009 | Guo |
| 7,606,138 B2 | 10/2009 | Wang |
| 7,627,480 B2 | 12/2009 | Ojanpera |
| 7,707,030 B2* | 4/2010 | Edler et al. .......... 704/211 |
| 7,961,890 B2 | 6/2011 | Hoelzer |
| 7,966,191 B2 | 6/2011 | Schuijers |
| 8,155,954 B2* | 4/2012 | Edler et al. .......... 704/211 |
| 2003/0185339 A1 | 10/2003 | Heumann |
| 2004/0230419 A1 | 11/2004 | Chrysafis |
| 2005/0155429 A1 | 7/2005 | Griessler |
| 2006/0155794 A1 | 7/2006 | Lan |
| 2007/0239442 A1 | 10/2007 | Hotho |
| 2007/0286431 A1 | 12/2007 | Chou |
| 2008/0071528 A1 | 3/2008 | Ubale |
| 2008/0195397 A1 | 8/2008 | Myburg |
| 2008/0260256 A1 | 10/2008 | Zeng |
| 2008/0311848 A1 | 12/2008 | Proctor, Jr. |
| 2009/0074043 A1 | 3/2009 | Turaga |
| 2009/0094038 A1 | 4/2009 | Chivukula |
| 2009/0172060 A1 | 7/2009 | Taleb |
| 2009/0268803 A1 | 10/2009 | Merched |
| 2009/0276227 A1 | 11/2009 | Sapna |
| 2009/0323871 A1 | 12/2009 | Merched |
| 2010/0161319 A1* | 6/2010 | Edler et al. .......... 704/200.1 |
| 2010/0161700 A1 | 6/2010 | Noeldner |
| 2012/0020443 A1* | 1/2012 | Pham et al. .......... 375/350 |
| 2012/0136670 A1* | 5/2012 | Ishikawa et al. .......... 704/500 |
| 2012/0265534 A1* | 10/2012 | Coorman et al. .......... 704/265 |
| 2013/0238345 A1* | 9/2013 | Ekstrand et al. .......... 704/500 |

FOREIGN PATENT DOCUMENTS

| | | |
|---|---|---|
| EP | 0795984 | 9/2007 |
| EP | 1269346 | 10/2007 |
| EP | 1873942 | 1/2008 |
| EP | 1175030 | 2/2008 |
| GB | 2284121 | 5/1995 |
| GB | 2383412 | 6/2003 |
| TW | 201129970 | 9/2011 |
| WO | 1998/041929 | 9/1998 |
| WO | 2001/033335 | 5/2001 |
| WO | 2002/057901 | 7/2002 |
| WO | 2005/074153 | 8/2005 |
| WO | 2006/103584 | 10/2006 |
| WO | 2006/103586 | 10/2006 |
| WO | 2007/078254 | 7/2007 |
| WO | 2009/073421 | 6/2009 |
| WO | 2009/080680 | 7/2009 |
| WO | 2010/083321 | 7/2010 |
| WO | 2010/114949 | 10/2010 |

OTHER PUBLICATIONS

Sorensen, H. et al, "Efficient Computation of the DFT with Only a Subset of Input or Output Points," IEEE, vol. 41, Issue 3, Mar. 1993, pp. 1184-1200.

Medina-Melendrez, M. et al, "Input and/or Output Pruning of Composite Length FFTs Using a DIF-DIT Transform Decomposition," IEEE, vol. 57, Issue 10, Oct. 2009.

Huang, W. et al, "A Computationally Efficient DFT Scheme for Applications With a Subset of Nonzero Inputs," IEEE, 2008.

Whyland, W., "Reconstruction of Discrete-Time Signals from a Subset of Weighted DFT Outputs," IEEE, Apr. 1980.

Guo, H. et al, "The Quick Fourier Transform: An FFT Based on Symmetries," IEEE, vol. 46, Issue 2, Feb. 1998.

Guo, H. et al, "The Quick Discrete Fourier Transform," IEEE International Conference on Acoustics, Speech, and Signal Processing ICASSP, Apr. 1994 on pp. III/445 vol. 3.

Beaufays, F., "Transform-Domain Adaptive Filters: An Analytical Approach," IEEE, vol. 43, No. 2, pp. 422-31, Issue 2, Feb. 1995.

Advanced Television Systems Committee, "A/52B, ATSC Standard, Digital Audio Compression Standard (AC-3, E-AC-3), revision B," Jun. 14, 2005.

Iwadere, M. et al, "A 128 kb/s Hi-Fi Audio Codec Based on Adaptive Transform Coding with Adaptive Block Size MDCT," IEEE, vol. 10, Issue 1, Jan. 1992.

Duhamel, P. et al, "A Fast Algorithm for the Implementation of Filter Banks Based on 'Time Domain Aliasing Cancellation'," IEEE Acoustics, Speech and Signal Processing, 1991.

Skinner, D. P. et al, "Pruning the Decimation In-Time FFT Algorithm," IEE Transactions on Acoustics, Speech, and Signal Processing, vol. 24, Issue 2, Apr. 1976.

Princen, J.P. et al, "Subband/Transform Coding Using Filter Bank Designs Based on Time Domain Aliasing Cancellation," IEEE International Conference on ICASSP.

Lau W. et al, "A Common Transform Engine for MPEG & AC3 Audio Decoder," vol. 43, Issue 3, Aug. 1997.

De Smet, P. et al, "Optimized MPEG Audio Decoding Using Recursive Subband Synthesis Windowing," IEEE International Conference on Acoustics, Speech and Signal Processing, May 2002.

Mitra, S. K. et al, "DFT Calculation Via Subband Decomposition," Signal Processing V. Theories and Application, Fifth European Signal Processing Conference, Sep. 18-21, 1990, pp. 501-504, vol. 1.

Raghavan, V. et al, "Complexity of Pruning Strategies for the Frequency Domain LMS Algorithm," Signal Processing, vol. 86, Issue 10, pp. 2836-2843, Oct. 2006.

Wu, C. et al, "Preprocessing Methods in the Computation of the Fast Fourier Transform," 13th Annual Conference on Computers and Industrial Engineering, vol. 21, pp. 653-657, 1991.

ISO/IEC 13818-7, "Information Technology—Generic Coding of Moving Pictures and Associated Audio Information—Part 7: Advanced Audio Coding (AAC)," 1997.

ISO/IEC 14496-3, Subpart 4, "MPEG Audio," published b the International Standards Organization (ISO), 2009.

Bosi, M. et al, "ISO/IEC MPEG-2 Advanced Audio Coding," Journal of the Audio Engineering Society, vol. 45, Issue 10, Oct. 1997.

Chen, Z. et al. "Fast Hybrid DFT/DCT Architecture for OFDM in Cognitive Radio System" vol. 1, published in 2007, pp. 301-306.

Yang, Z. et al. "Chirp-Z Transform Algorithm Based on Real-Time Audio Signal Processing" Communication and Information Technology, Jun. 30, 2005, pp. 48-52.

International Preliminary Report on Patentability in International Applications No. PCT/US2012/029603, dated Oct. 1, 2013, 7 pages.

(56) References Cited

OTHER PUBLICATIONS

International Search Report and Written Opinion in International Applications No. PCT/US2012/029603, dated Jun. 15, 2012, 8 pages.

\* cited by examiner

REDUCED COMPLEXITY TRANSFORM FOR A LOW-FREQUENCY-EFFECTS CHANNEL

CROSS-REFERENCE TO RELATED APPLICATIONS

This application claims priority to U.S. Patent Provisional Application No. 61/468,373, filed 28 Mar. 2011, hereby incorporated by reference in its entirety.

TECHNICAL FIELD

The present invention pertains generally to digital signal processing and is directed more particularly toward methods and apparatuses that may be used to apply filterbanks to limited bandwidth audio channels such as so called low-frequency-effects (LFE) channels using fewer computational resources.

BACKGROUND ART

Several international, regional and national standards have been developed to define methods and systems that may be used to implement multichannel audio coding systems. Three examples of such standards include ISO/IEC 13818-7, Advanced Audio Coding (AAC), also known as "MPEG-2 AAC," and ISO/IEC 14496-3, subpart 4, also known as "MPEG-4 audio," published by the International Standards Organization (ISO), and a standard published by the United States Advanced Television Systems Committee (ATSC), Inc. in Document A/52B entitled "Digital Audio Compression Standard (AC-3, E-AC-3)," Revision B, published Jun. 14, 2005, also known as "Dolby Digital" or "AC-3."

Audio systems that conform to standards like those mentioned above generally include transmitters that apply an analysis filterbank to each of several channels of input audio signals, process the output of the analysis filterbanks into encoded signals and transmit or record the encoded signals, and receivers that receive the encoded signals, decode them and apply synthesis filterbanks to the decoded signals to generate channels of output audio signals that are a replica of the original input audio signals. Many of the standards specify implementing the analysis and synthesis filterbanks by a Modified Discrete Transform (MDCT) and an Inverse Modified Discrete Transform (IMDCT) described in Princen, Johnson, and Bradley, "Subband/Transform Coding Using Filter Bank Designs Based on Time Domain Aliasing Cancellation," *ICASSP* 1987 *Conf. Proc., May* 1987, pp. 2161-64.

Filterbanks that are implemented by these particular transforms have many attractive properties but significant processing or computational resources are required to perform the needed calculations. Techniques are known that can be used to perform the transforms more efficiently, thereby reducing the amount of computational resources that are needed. One characteristic that is common to these techniques is that their computational complexity varies with the so-called length of the transform. Techniques are known that can realize further reductions in computational complexity by using shorter transform lengths to process audio channels with narrower bandwidths.

Standards like those mentioned above define sequences of digital data or digital bit streams that carry data representing encoded representations of one or more audio channels. One configuration of channels sometimes referred to as "5.1 channels" includes five full-bandwidth channels denoted left (L), right (R), center (C), left-surround (LS), and right-surround (RS), and one limited-bandwidth channel or low-frequency-effects (LFE) channel. The full-bandwidth channels typically have a bandwidth of about 20 kHz and the limited-bandwidth LFE channel typically has a bandwidth of about 100 to 200 Hz. Because the bandwidth of the LFE channel is narrower, known techniques can be used to perform a filterbank transform more efficiently for the LFE channel than can be performed for one of the full-bandwidth channels.

Nevertheless, there is a need to develop techniques that further improve the efficiency of the transform filterbanks that are applied to limited-bandwidth channels like the LFE channel.

DISCLOSURE OF INVENTION

It is an object of the present invention to provide ways that can be used to perform transforms that implement filterbanks for limited-bandwidth channel signals more efficiently than is possible using known techniques.

According to one aspect of the present invention, a limited-bandwidth signal is processed by receiving a block of K real-valued transform coefficients of which only a number L of the coefficients represent spectral components of a limited-bandwidth audio signal, where $\frac{1}{2}L<M<K$, and M is a power of two; applying a first-transform of length R to a block of complex-valued coefficients derived from M complex-valued transform coefficients that include the L real-valued transform coefficients representing spectral components of the limited-bandwidth audio signal, wherein $$R = \frac{M}{P}$$

and P is a power of two; applying a bank of Q second transforms of length P to outputs of the first transform; and deriving a sequence of N real-valued signal samples from outputs of the bank of second transforms, where $N=2 \cdot K$ and the real-valued signal samples represent temporal components of the limited-bandwidth audio signal.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Figure 1:
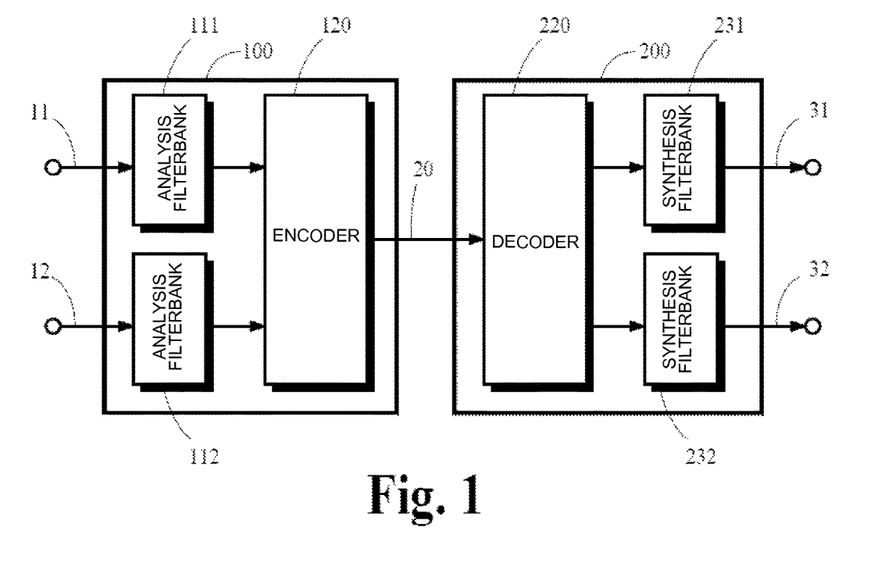
FIG. 1 is a schematic block diagram of an audio coding system in which various aspects of the present invention may be carried out.

FIG. 1 is a schematic illustration of a two-channel audio coding system that includes a transmitter 100 and a receiver 200. The transmitter 100 receives from the paths 11, 12 two channels of input audio signals. The analysis filterbanks 111, 112 are applied to the input audio channels to obtain a first set of frequency-subband signals representing the spectral content of the input audio signals. These analysis filterbanks are implemented by time-domain to frequency-domain transforms. The encoder 120 applies an encoding process to the first set of frequency-subband signals to generate encoded information, which is passed along the path 20. The receiver 200 receives the encoded information from the path 20. Decoder 220 applies a decoding process to the encoded information to obtain a second set of frequency-subband signals. The synthesis filterbanks 231, 232 are applied to the second set of frequency-subband signals to generate two or more channels of output audio signals, which are passed along the paths 31, 32. These synthesis filterbanks are implemented by frequency-domain to time-domain transforms. The path 20 may be a broadcast medium, a point-to-point communication medium, a recording medium or any other medium that can convey or record the encoded information.

The encoder 120 and the decoder 220 are not essential to practice the present invention. If they are used, they may perform either lossless or lossy coding processes. The present invention is not limited to any particular encoding and decoding processes.

Only two channels of input and output audio signals are shown in the drawings for illustrative clarity. In many implementations there are more than two channels of input audio signals and more than two channels of output audio signals. At least one of the output audio signals has a bandwidth that is much narrower than the bandwidth of one or more of the other output audio signals.

The present invention is directed toward reducing the computational resources needed to perform the transform that implements the synthesis filterbank 231 or 232 in the receiver 200 used to generate narrower bandwidth output audio signals. The present invention can implement a more efficient synthesis filterbank in a receiver 200 that maintains compatibility with an analysis filterbank in existing transmitters 100.

The present invention may also be used to reduce the computational resources needed to perform the transform that implements the analysis filterbank 111 or 112 in the transmitter 100 applied to narrower bandwidth input audio signals. This implementation can maintain compatibility with a synthesis filterbank in existing receivers 200.

B. Implementation Techniques

Synthesis filterbanks can be implemented by a wide variety of frequency-domain to time-domain transforms including many variations of the Inverse Discrete Cosine Transform (IDCT) and the Inverse Modified Discrete Cosine Transform (IMDCT) mentioned above. The algorithms that define these transforms in a direct manner are referred to herein as "direct transforms."

Figure 2:
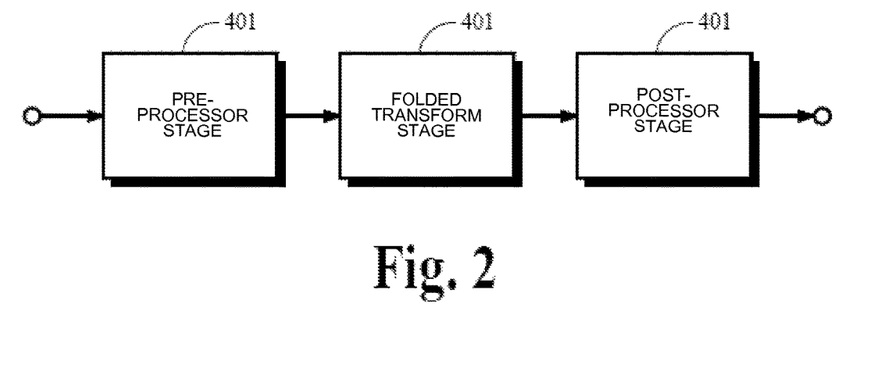
FIG. 2 is a schematic block diagram of a process that may be used to perform a synthesis transform in the coding system shown in FIG. 1.

One technique referred to herein as a "folding technique" can be used to perform these direct transforms more efficiently. The folding technique comprises three stages as illustrated in FIG. #2. The second stage 402 performs a transform that has a shorter length than the direct transform this folding technique implements. The transform that is performed in the second stage 402 is referred to as a "folded transform" so that the following description can more easily distinguish it from the direct transform.

The pre-processor stage 401 combines transform coefficients in a block of K real-valued frequency-domain transform coefficients into a block of ½·K complex-valued transform coefficients. The transform stage 402 applies a frequency-domain to time-domain folded transform of length ½·K to the block of complex-valued transform coefficients to generate ½·K complex-valued time-domain samples. The post-processor stage 403 derives a sequence of K real-valued time-domain samples from the ½·K complex-valued time-domain signal samples. Except for any errors that might occur from finite-precision arithmetic operations, the K time-domain signal samples that are obtained by this technique are identical to the K time-domain signal samples that could be obtained by applying the direct transform of length K to the block of K real-valued frequency-domain transform coefficients. This technique improves efficiency because the additional computational resources needed to perform the direct transform as opposed to the folded transform in the stage 402 is greater than the computational resources needed to implement the processes performed in the pre-processor stage 401 and the post-processor stage 403.

If a block of transform coefficients represents a narrow-bandwidth signal in which a significant number of the transform coefficients are always zero, an additional transform-decomposition technique may be used to increase processing efficiency of the folded transform that is performed in the stage 402.

This technique is discussed in the following sections.

1. Direct Transforms

The direct IMDCT is shown in expression 2. Its complementary Modified Discrete Cosine Transform (MDCT) is shown in expression 1.

$$X(k) = \sum_{n=0}^{N-1} x(n) \cdot \cos\left[\frac{2\pi}{N}\left(n + \frac{1}{2} + \frac{N}{4}\right)\left(k + \frac{1}{2}\right)\right] \text{ for } 0 \leq k < K \quad (1)$$

$$x(n) = \frac{2}{N}\sum_{k=0}^{K-1} X(k) \cdot \cos\left[\frac{2\pi}{N}\left(n + \frac{1}{2} + \frac{N}{4}\right)\left(k + \frac{1}{2}\right)\right] \text{ for } 0 \leq n < N \quad (2)$$

where $X(k)$=real-valued frequency-domain transform coefficient k;

$K$=total number of real-valued frequency-domain transform coefficients;

$x(n)$=real-valued time-domain signal sample n; and $N$=length of time-domain window of samples, where $N=2K$.

The proper operation of these direct transforms requires the use of analysis window functions and synthesis window functions whose lengths and shapes meet certain requirements that are well known in the art. The analysis window function is applied to segments of N input audio signal samples prior to the application of the MDCT. The synthesis window function is applied to segments of N samples obtained from an application of the IMDCT to blocks of K transform coefficients and these windowed segments of samples are overlapped and added to windowed segments of samples obtained from other blocks of transform coefficients. Additional details may be obtained from the Princen et al. paper cited above. The following paragraphs omit further discussion of the analysis window function.

2. Folding Technique

The process performed in the pre-processor stage 401 may be expressed as:

$$X'(k) = \left[X\left(\frac{N}{2} - 2k - 1\right) + j \cdot X(2k)\right] \cdot \begin{bmatrix} -\cos\left(\frac{2\pi(8k+1)}{8N}\right) - \\ j \cdot \sin\left(\frac{2\pi(8k+1)}{8N}\right) \end{bmatrix} \quad (3)$$

$$\text{for } 0 \le k < \frac{N}{4}$$

where X'(k)=complex-valued frequency-domain transform coefficient k; and
j=imaginary operator equal to $\sqrt{-1}$.

The folded transform performed in the transform stage 402 may be expressed as:

$$x'(n) = \sum_{k=0}^{\frac{N}{4}-1} X'(k) \cdot (W_{N/4})^{n \cdot k} \text{ where } W_N = e^{j\left(\frac{2\pi}{N}\right)}; \quad (4)$$

and
x'(n)=complex-valued time-domain signal sample.

The process performed in the post-processor stage 403 may be expressed as:

$$y(n) = \quad (5)$$

$$(\text{Re}[x'(n)] + j \cdot \text{Im}[x'(n)]) \cdot \left(-\cos\left(\frac{2\pi(8n+1)}{8N}\right) - j \cdot \sin\left(\frac{2\pi(8n+1)}{8N}\right)\right)$$

where y(n)=intermediate sample value used in subsequent windowing calculations;
Re[x'(n)]=real part of the complex value x'(n); and
Im[x'(n)]=imaginary part of the complex value x'(n).

3. Synthesis Window Function for IMDCT

Proper operation of the IMDCT includes applying a properly designed synthesis window function to the time-domain samples generated by the transform. The time-domain signal samples that are obtained from this windowing operation may be expressed as:

$$\left.\begin{array}{l} y'(2n) = -\text{Im}\left[y\left(\frac{N}{4} + n\right)\right] \cdot h(n) \\ y'(2n+1) = \text{Re}\left[y\left(\frac{N}{4} - n - 1\right)\right] \cdot h\left(\frac{3N}{4} + n\right) \\ y'\left(\frac{N}{2} + 2n\right) = -\text{Re}[y(n)] \cdot h\left(\frac{N}{4} + n\right) \\ y'\left(\frac{N}{2} + 2n + 1\right) = \text{Im}\left[y\left(\frac{N}{2} - n - 1\right)\right] \cdot h\left(\frac{N}{2} + n\right) \end{array}\right\} \text{ for } 0 \le n < \frac{N}{4} \quad (6)$$

where h(n)=point n in the synthesis window function; and
y'(n)=windowed intermediate sample n.

The windowed intermediate samples y' obtained from expression 6 are the intermediate time-domain samples that could have been obtained by application of the direct IMDCT to a block of the frequency-domain transform coefficients X followed by an application of the synthesis window function h. As explained in the Princen paper cited above, the output time-domain signal samples are obtained by overlapping and adding the windowed interim samples derived from a "current" block of transform coefficients with a set of "previous" windowed interim samples derived from a previous block of transform coefficients. This overlap-add process may be expressed as:

$$x(n) = y'(n) + y'_{prev}(n) \quad (7)$$

where y'$_{prev}$(n)=previous windowed interim samples.

4. Transform-Decomposition Technique

A transform decomposition technique may be used to derive a more efficient method for performing the folded transform for limited bandwidth signals in which some of the transform coefficients in a block of frequency-domain transform coefficients are known to be equal to zero. This decomposition technique consists of expressing the folded transform as an equivalent two-dimensional transform and decomposing this two-dimensional transform into a single-dimension vertical transform followed by a bank of single-dimension horizontal Inverse Discrete Fourier Transforms (IDFT). The vertical transform has a length equal to Q and the bank of horizontal complex IDFT comprises Q transforms each having a length equal to P, where P and Q are integers and the product of P and Q equals the length of the folded transform.

Referring to the preceding discussion of the folding technique, it may be seen that the length of the folded transform is J=¼·N=½K; therefore, P·Q=J. The values for P, Q and J are constrained to be powers of two.

The horizontal IDFT and the vertical transform are shown in expressions 8 and 9, respectively:

$$x'(n + Q \cdot m) = \sum_{p=0}^{P-1} U(n, p) \cdot (W_p)^{p \cdot m} \text{ for } 0 \le n < Q \text{ and } 0 \le m < P \quad (8)$$

$$\text{where } U(n, p) = \sum_{q=0}^{Q-1} X'(P \cdot q + p) \cdot (W_{N/4})^{(P \cdot q + p) \cdot n} \text{ for } 0 \le n < Q. \quad (9)$$

The transform kernel W$_{N/4}$ in the vertical transform may be calculated using Euler's law:

$$(W_{N/4})^{n \cdot m} = \cos\left(\frac{8\pi \cdot n \cdot m}{N}\right) + j \cdot \sin\left(\frac{8\pi \cdot n \cdot m}{N}\right) \quad (10)$$

Because the direct transform coefficients X(k) represent an audio signal in an LFE channel with a limited bandwidth, only L of these coefficients can have a value other than zero, where L is much less than K. As a result, no more than $$\left\lceil \frac{L}{2} \right\rceil$$

of the complex-valued frequency-domain transform coefficients X'(k) obtained from the pre-processor stage 401 may have values other than zero and the length of the vertical transform may be reduced. A value M is chosen such that it is the smallest power-of-two equal to or greater than this number $$\left\lceil \frac{L}{2} \right\rceil$$

and the folding process is modified to derive M complex-valued frequency-domain transform coefficients X'(k) that include the L real-valued direct transform coefficients that can have non-zero values. These M complex-valued frequency-domain transform coefficients are to be processed by the transform stage 402. The size R of the vertical transform is chosen such that $$R = \frac{M}{P}.$$

The transform coefficients X'(P·r+p) are zero for Pr+p≥2R or, alternatively, r≥R. By taking these considerations into account, expression 9 can be written as:

$$U(n, p) = \sum_{r=0}^{R-1} \left[ \begin{array}{l} X'(P \cdot r + p) \cdot (W_{N/4})^{(P \cdot r + p) \cdot n} + \\ X'\left(\frac{N}{4} - M + (P \cdot r + p)\right) \cdot (W_{N/4})^{\left(\frac{N}{4} - M + (P \cdot r + p)\right) \cdot n} \end{array} \right] \quad (11)$$

$$= \sum_{r=0}^{R-1} X'(P \cdot r + p) \cdot (W_{N/4})^{(P \cdot r + p) \cdot n} +$$

$$\sum_{r=0}^{R-1} X'\left(\frac{N}{4} - M + (P \cdot r + p)\right) \cdot (W_{N/4})^{\left(\frac{N}{4} - M + (P \cdot r + p)\right) \cdot n}$$

for $0 \leq n < Q, 0 \leq p < P$.

5. Integrated Pre-Processor and Vertical Transform

The efficiency of the folding technique combined with the transform-decomposition technique as described above can be improved further by integrating the pre-processor stage 401 and the vertical transform as shown in expression 9 into one process. This is illustrated schematically in FIG. 3.

Figure 3:
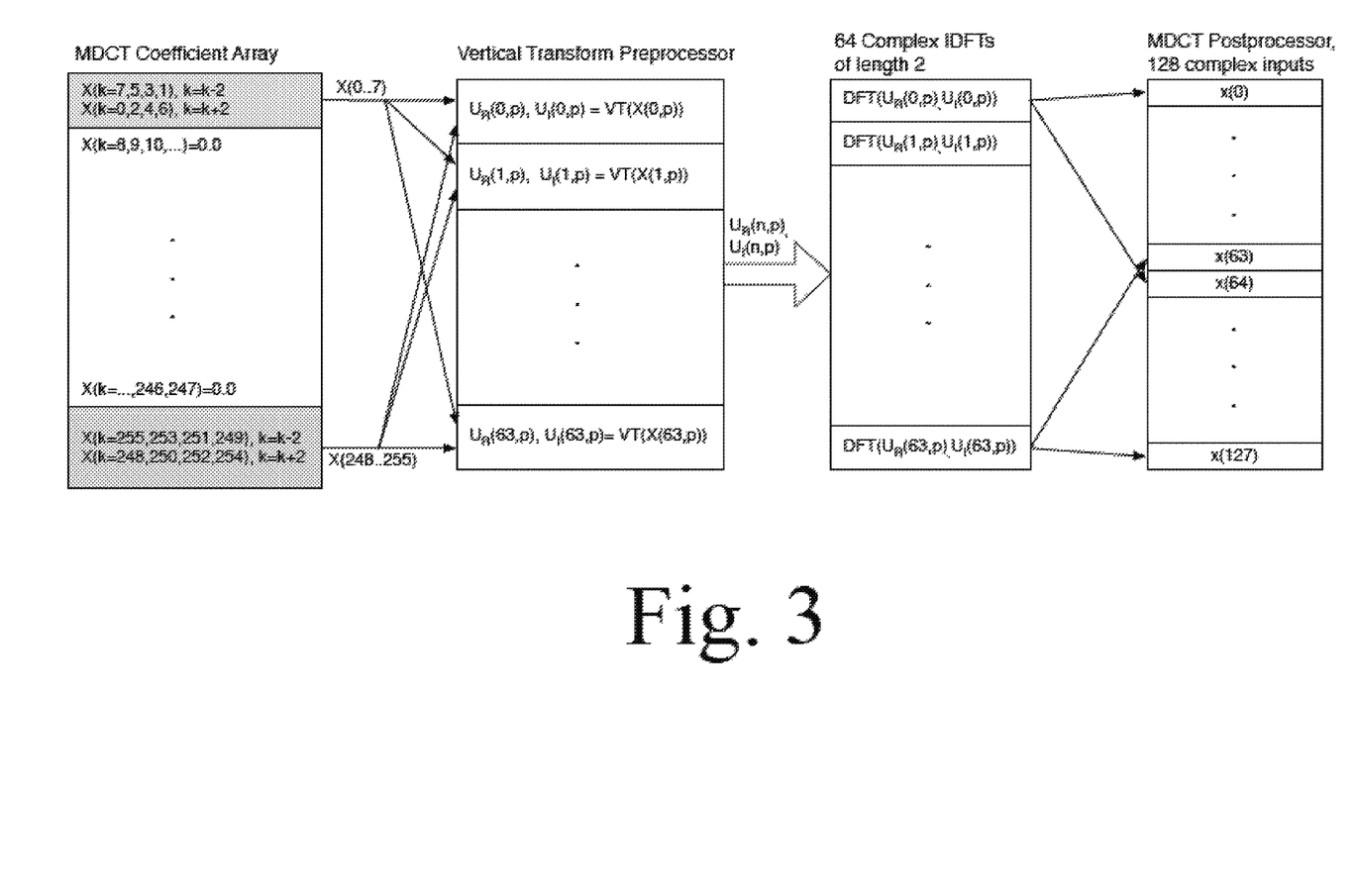
FIGS. 3 and 4 are schematic block diagrams that illustrate some features that may be used to perform a portion of the process shown in FIG. 2.

The length R of the vertical transform may be chosen to be equal to the value M or be a power-of-two sub-multiple 1/P of the value M. In an embodiment that conforms to the AC-3 standard mentioned above, the number ½·N of real-valued frequency-domain transform coefficients is equal to 256 and the spectral content of the audio signal in the LFE channel can be represented by seven real-valued transform coefficients X(k), where 0≤k<7. The pre-processor stage 401 folds these seven real-valued transform coefficients into four complex-valued transform coefficients that are subsequently processed by the folded transform whose length is J=¼·N=128. As a result, given four complex-valued transform coefficients in this embodiment, M is equal to four and R can be set equal to either 4, 2 or 1 by setting P equal to 1, 2 or 4, respectively. Because P·Q=J, the horizontal transform length Q is equal to 128, 64 and 32 when P is equal to 1, 2 and 4, respectively. Little or no gain in efficiency is achieved when P equals one.

When P is set equal to two, the values obtained from the output of the vertical transform indices do not need to be bit-reversed given the small number of coefficients computed in each of the horizontal transforms. The need for bit reversal of transform indices for the Cooley-Tukey FFT algorithm is well known. Bit reversal is not needed when P is set equal to two, however, because the bit-reversal for a complex DFT of length two produces the same coefficient indexing that is achieved by performing no bit-reversal. This computational advantage is offset by having a larger number of horizontal transforms to perform. The values for P and Q may be selected in response to various design considerations such as processing limitations in the hardware chosen to implement the processes.

An integration of the process shown in expression 3 with the vertical transform shown in expression 9 can be derived by making substitutions for X'(k) and $(W_{N/4})^{(P \cdot r + p)n}$ in expression 9 according to the expressions 3 and 10, respectively. These substitutions yield the following kernel function for the vertical transform:

$$\left[ \begin{array}{l} X\left(\frac{N}{2} - 2(P \cdot q + p) - 1\right) + \\ j \cdot X(2(P \cdot q + p)) \end{array} \right]. \quad (12)$$

$$\left[ \begin{array}{l} -\cos\left(\frac{2\pi(8(P \cdot q + p) + 1)}{8N}\right) - \\ j \cdot \sin\left(\frac{2\pi(8(P \cdot q + p) + 1)}{8N}\right) \end{array} \right] \cdot \left[ \begin{array}{l} \cos\left(\frac{8\pi(P \cdot q + p) \cdot n}{N}\right) + \\ j \cdot \sin\left(\frac{8\pi(P \cdot q + p) \cdot n}{N}\right) \end{array} \right]$$

for $0 \leq (P \cdot q + p) < \left(\frac{N}{4} - 1\right)$.

The cross product of sine and cosine terms in expression 12 can be rewritten as:

$$\left[ -\cos\left(\frac{2\pi(8s + 1)}{8N}\right) \cdot \cos\left(\frac{8\pi sn}{N}\right) + \sin\left(\frac{2\pi(8s + 1)}{8N}\right) \cdot \sin\left(\frac{8\pi sn}{N}\right) \right] - \quad (13)$$

$$j \cdot \left[ \cos\left(\frac{2\pi(8s + 1)}{8N}\right) \cdot \sin\left(\frac{8\pi sn}{N}\right) + \sin\left(\frac{2\pi(8s + 1)}{8N}\right) \cdot \cos\left(\frac{8\pi sn}{N}\right) \right] =$$

$$(-\cos\alpha \cdot \cos\beta + \sin\alpha \cdot \sin\beta) - j \cdot (\cos\alpha \cdot \sin\beta + \sin\alpha \cdot \cos\beta) =$$

$$-\cos(\alpha + \beta) - j \cdot \sin(\alpha + \beta)$$

where $s = P \cdot q + p$;

$$\alpha = \frac{2\pi(8s + 1)}{8N}; \text{ and}$$

$$\beta = \frac{8\pi sn}{N}.$$

It may be seen that $$\alpha + \beta = \frac{\pi(8s \cdot (1 + 4n) + 1)}{4N} \quad (14)$$

which we denote as I(s,n) to simplify the following expressions. Using this notation, expression 11 may be rewritten as:

$$U(n, p) = \quad (15)$$

$$\sum_{r=0}^{R-1} \left[ X\left(\frac{N}{2} - 2v - 1\right) + j \cdot X(2v) \right] \cdot (-\cos(I(v, n)) - j \cdot \sin(I(v, n))) +$$

-continued $$\sum_{r=0}^{R-1}\left[X\left(\frac{N}{2}-2u-1\right)+j\cdot X(2u)\right]\cdot(-\cos(I(u,n))-j\cdot\sin(I(u,n)))$$

where v=P·r+p; and $$u=\frac{N}{4}-M+(P\cdot r+p).$$

Performing the complex multiply we get:

$$U(n,p)=\sum_{r=0}^{R-1}\begin{bmatrix}-X\left(\frac{N}{2}-2v-1\right)\cdot\cos(I(v,n))-\\ j\cdot X\left(\frac{N}{2}-2v-1\right)\cdot\sin(I(v,n))-\\ j\cdot X(2v)\cdot\cos(I(v,n))+X(2v)\cdot\sin(I(v,n))\end{bmatrix}+ \quad (16)$$

$$\sum_{r=0}^{R-1}\begin{bmatrix}-X\left(\frac{N}{2}-2u-1\right)\cdot\cos(I(u,n))-\\ j\cdot X\left(\frac{N}{2}-2u-1\right)\cdot\sin(I(u,n))-\\ j\cdot X(2u)\cdot\cos(I(u,n))+X(2u)\cdot\sin(I(u,n))\end{bmatrix}$$

The computational complexity of the function U(n,p) can be reduced further by taking advantage of the fact that the frequency-domain coefficients X(v) can be non-zero only for 0≤v<2R. This reduction is reflected in the following expression that also divides the function into real and imaginary component functions $U_R(n,p)$ and $U_I(n,p)$, respectively, where $U(n,p)=U_R(n,p)+j\cdot U_I(n,p)$:

$$U_R(n,p)=\sum_{r=0}^{R-1}[X(2v)\cdot\sin(I(v,n))-X(2M-2v-1)\cdot\cos(I(u,n))] \quad (17)$$

$$U_I(n,p)=\sum_{r=0}^{R-1}[-X(2v)\cdot\cos(I(v,n))-X(2M-2v-1)\cdot\sin(I(u,n))]$$

Figure 4:
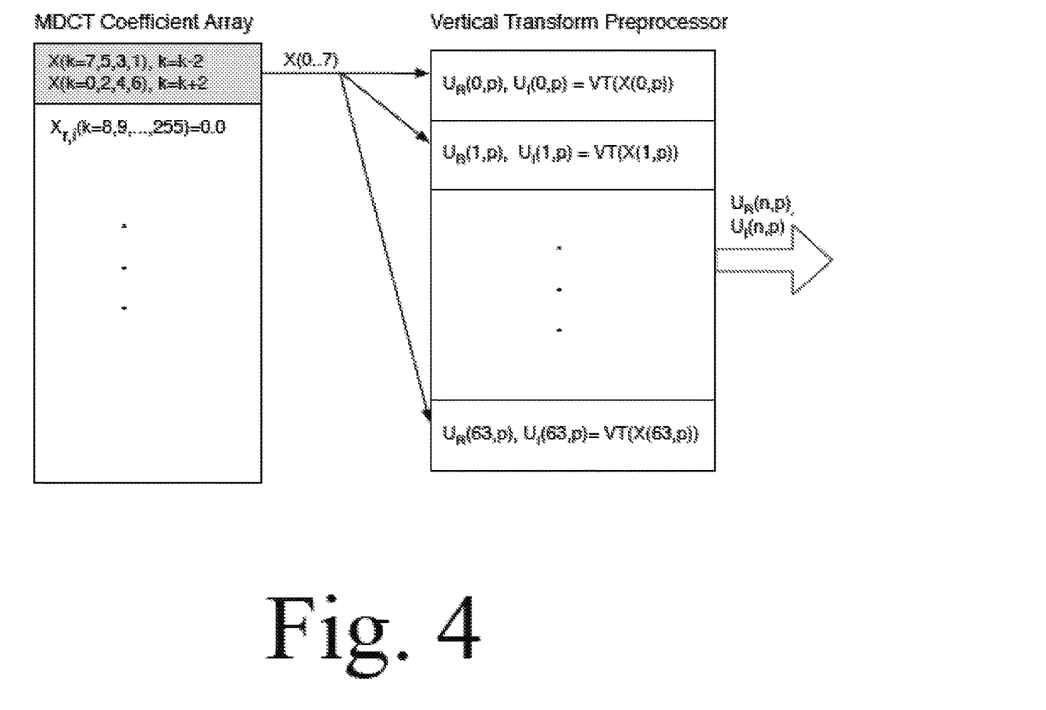

This integration of the pre-processor stage 401 and the vertical transform is illustrated schematically in FIG. 4.

The computational resources required to implement the function U(n,p) or its component functions $U_R(n,p)$ and $U_I(n,p)$ can be reduced by pre-calculating the functions sin(I(v,n)), cos(I(v,n)), sin(I(u,n)) and cos(I(u,n)) for all values of v, u and n. Storing the calculated results in lookup tables requires 4·P·R·Q entries, where the factor of four accounts for all combinations of sine, cosine, v and u in expression 17.

The size of the table may be reduced further by 12.5% by recognizing that $$I(0,n)=\frac{\pi}{4N}$$

for all n. As a result, the number of entries required for all factors of X in expression 17 is on the order of 3.5·P·R·Q.

If the size of these tables is larger than desired, their size can be reduced by taking advantage of the fact that many of the entries for I(v,n) in the table have duplicate values due to the periodicity of the sine and cosine basis functions. This reduction in size can be achieved in exchange for additional processing resources needed to lookup entries in table because a more elaborate indexing scheme will be needed to access data in the table.

Other techniques may be used to reduce table-size requirements. For example, if sine and cosine tables already exist in a particular implementation, then only I(v,n) and I(u,n) are needed, which reduces the number of table entries by a factor of two.

C. Implementation

Figure 5:
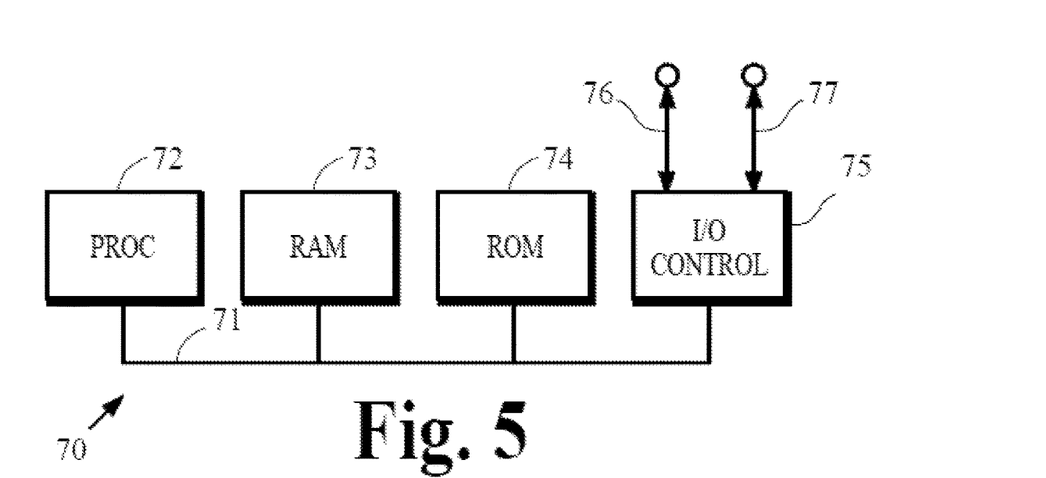
FIG. 5 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 5 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general-purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method performed by an audio signal processing device, for decoding an encoded digital audio signal, wherein the method comprises:
    receiving, by the audio signal processing device, the encoded digital audio signal;
    decoding, by the audio signal processing device, the received encoded digital audio signal to generate a block of real-valued transform coefficients, wherein the block has a quantity K of real-valued transform coefficients of which only a number L of the real-valued transform coefficients represent spectral components of a limited-bandwidth audio signal, ½ L<M<K, and M is a power of two;

transforming, by the audio signal processing device, the block of real-valued transform coefficients to generate a sequence of N real-valued signal samples representing temporal components of the limited-bandwidth audio signal, wherein N=2·K; and outputting, by the audio signal processing device, the real-valued signal samples representing temporal components of the limited-bandwidth audio signal;

wherein the transforming comprises:

applying, by the audio signal processing device, a first-transform of length R to either the L real-valued transform coefficients representing spectral components of the limited-bandwidth audio signal, or complex-valued coefficients derived from the L real-valued transform coefficients representing spectral components of the limited-bandwidth audio signal, wherein $$R = \frac{M}{P}$$

and P is a power of two;

applying, by the audio signal processing device, a bank of Q second transforms of length P to outputs of the first transform; and deriving, by the audio signal processing device, the sequence of N real-valued signal samples from outputs of the bank of second transforms.

2. The method of claim 1, wherein:

each of the second transforms is equivalent to performing calculations expressed as $$x'(n + Q \cdot m) = \sum_{p=0}^{P-1} U(n, p) \cdot (W_P)^{p \cdot m}$$

for $0 \le n < Q$ and $0 \le m < P$;

the sequence of real-valued signal samples is derived from the outputs of the bank of second transforms by performing calculations equivalent to $$y(n) = (\text{Re}[x'(n)] + j \cdot \text{Im}[x'(n)]) \cdot \left(-\cos\left(\frac{2\pi(8n+1)}{8N}\right) - j \cdot \sin\left(\frac{2\pi(8n+1)}{8N}\right)\right);$$

where x' represents the outputs of the second transform;

U(n,p)=a kernel function of the first transform;

$$W_P = e^{j\left(\frac{2\pi}{P}\right)};$$

y(n) represents intermediate signal samples;

Re[x'(n)]=real part of x'(n);

Im[x'(n)]=imaginary part of x'(n);

j=imaginary operator equal to $\sqrt{-1}$; and m, n and p are indices used in calculations.

3. The method of claim 1, wherein the first transform is equivalent to performing calculations expressed as $$U(n, p) = \sum_{r=0}^{R-1} \left[ X'(P \cdot r + p) \cdot (W_{N/4})^{(P \cdot r + p) \cdot n} + X'\left(\frac{N}{4} - M + (P \cdot r + p)\right) \cdot (W_{N/4})^{\left(\frac{N}{4} - M + (P \cdot r + p)\right) \cdot n} \right] =$$

$$\sum_{r=0}^{R-1} X'(P \cdot r + p) \cdot (W_{N/4})^{(P \cdot r + p) \cdot n} +$$

$$\sum_{r=0}^{R-1} X'\left(\frac{N}{4} - M + (P \cdot r + p)\right) \cdot (W_{N/4})^{\left(\frac{N}{4} - M + (P \cdot r + p)\right) \cdot n}$$

for $0 \le n < Q$ and $0 \le p < P$;

where X' represents the complex-valued coefficients;

$$R = \frac{M}{P};$$

and r is an index used in calculations.

4. The method of claim 1, wherein the first transform is equivalent to performing calculations expressed as $$U(n, p) =$$

$$\sum_{r=0}^{R-1} \left[ -X\left(\frac{N}{2} - 2v - 1\right) \cdot \cos(I(v, n)) - j \cdot X\left(\frac{N}{2} - 2v - 1\right) \cdot \sin(I(v, n)) - j \cdot X(2v) \cdot \cos(I(v, n)) + X(2v) \cdot \sin(I(v, n)) \right] +$$

$$\sum_{r=0}^{R-1} \left[ -X\left(\frac{N}{2} - 2u - 1\right) \cdot \cos(I(u, n)) - j \cdot X\left(\frac{N}{2} - 2u - 1\right) \cdot \sin(I(u, n)) - j \cdot X(2u) \cdot \cos(I(u, n)) + X(2u) \cdot \sin(I(u, n)) \right]$$

for $0 \le n < Q$ and $0 \le p < P$;

where X represents the real-valued transform coefficients;

$$R = \frac{M}{P};$$

$$I(s, n) = \frac{\pi(8s \cdot (1 + 4n) + 1)}{4N};$$

$$v = P \cdot r + p;$$

$$u = \frac{N}{4} - M + (P \cdot r + p);$$

and r is an index used in calculations.

5. The method of claim 1, wherein the first transform is equivalent to performing calculations expressed as $$U_R(n, p) = \sum_{r=0}^{R-1} [X(2v) \cdot \sin(I(v, n)) - X(2M - 2v - 1) \cdot \cos(I(u, n))]$$

and

-continued $$U_I(n, p) = \sum_{r=0}^{R-1} [-X(2v) \cdot \cos(I(v, n)) - X(2M - 2v - 1) \cdot \sin(I(u, n))]$$

for $0 \le n < Q$ and $0 \le p < P$;

where X represents the real-valued transform coefficients;

$$R = \frac{M}{P};$$

$$I(s, n) = \frac{\pi(8s \cdot (1 + 4n) + 1)}{4N};$$

$$v = P \cdot r + p;$$

$$u = \frac{N}{4} - M + (P \cdot r + p);$$

and r is an index used in calculations.

6. The method of claim 1, further comprising generating the limited-bandwidth audio signal using the real-valued signal samples.

7. An audio signal processing device for decoding an encoded digital audio signal, wherein the audio signal processing device comprises one or more processors configured to:

receive the encoded digital audio signal decode the received encoded digital audio signal to generate a block of real-valued transform coefficients, wherein the block has a quantity K of real-valued transform coefficients of which only a number L of the real-valued transform coefficients represent spectral components of a limited-bandwidth audio signal, ½ L<M<K, and M is a power of two;

transform the block of real-valued transform coefficients to generate a sequence of N real-valued signal samples representing temporal components of the limited-bandwidth audio signal, wherein N=2·K, and outputting the real-valued signal samples representing temporal components of the limited-bandwidth audio signal;

wherein the transforming comprises:

applying a first-transform of length R to either the L real-valued transform coefficients representing spectral components of the limited-bandwidth audio signal, or complex-valued coefficients derived from the L real-valued transform coefficients representing spectral components of the limited-bandwidth audio signal, wherein $$R = \frac{M}{P}$$

and P is a power of two;

applying a bank of Q second transforms of length P to outputs of the first transform; and deriving the sequence of N real-valued signal samples from outputs of the bank of second transforms.

8. The audio signal processing device of claim 7, wherein:

each of the second transforms is equivalent to performing calculations expressed as $$x'(n + Q \cdot m) = \sum_{p=0}^{P-1} U(n, p) \cdot (W_P)^{p \cdot m}$$

for $0 \le n < Q$ and $0 \le m < P$;

the sequence of real-valued signal samples is derived from the outputs of the bank of second transforms by performing calculations equivalent to $$y(n) = (\text{Re}[x'(n)] + j \cdot \text{Im}[x'(n)]) \cdot \left(-\cos\left(\frac{2\pi(8n + 1)}{8N}\right) - j \cdot \sin\left(\frac{2\pi(8n + 1)}{8N}\right)\right);$$

where x' represents the outputs of the second transform;
U(n,p)=a kernel function of the first transform;

$$W_P = e^{j \cdot \left(\frac{2\pi}{P}\right)};$$

y(n) represents intermediate signal samples;
Re[x'(n)]=real part of x'(n);
Im[x'(n)]=imaginary part of x'(n);
j=imaginary operator equal to $\sqrt{-1}$; and
m, n and p are indices used in calculations.

9. The audio signal processing device of claim 7, wherein the first transform is equivalent to performing calculations expressed as $$U(n, p) = \sum_{r=0}^{R-1} \left[ X'(P \cdot r + p) \cdot (W_{N/4})^{(P \cdot r + p) \cdot n} + X'\left(\frac{N}{4} - M + (P \cdot r + p)\right) \cdot (W_{N/4})^{\left(\frac{N}{4} - M + (P \cdot r + p)\right) \cdot n} \right] = $$

$$\sum_{r=0}^{R-1} X'(P \cdot r + p) \cdot (W_{N/4})^{(P \cdot r + p) \cdot n} + $$

$$\sum_{r=0}^{R-1} X'\left(\frac{N}{4} - M + (P \cdot r + p)\right) \cdot (W_{N/4})^{\left(\frac{N}{4} - M + (P \cdot r + p)\right) \cdot n}$$

for $0 \le n < Q$ and $0 \le p < P$;

where X' represents the complex-valued coefficients;

$$R = \frac{M}{P};$$

and r is an index used in calculations.

10. The audio signal processing device of claim 7, wherein the first transform is equivalent to performing calculations expressed as $$U(n, p) = $$

$$\sum_{r=0}^{R-1} \left[ -X\left(\frac{N}{2} - 2v - 1\right) \cdot \cos(I(v, n)) - j \cdot X\left(\frac{N}{2} - 2v - 1\right) \cdot \sin(I(v, n)) - \right.$$

$$\left. j \cdot X(2v) \cdot \cos(I(v, n)) + X(2v) \cdot \sin(I(v, n)) \right] + $$

$$\sum_{r=0}^{R-1} \left[ -X\left(\frac{N}{2} - 2u - 1\right) \cdot \cos(I(u, n)) - j \cdot X\left(\frac{N}{2} - 2u - 1\right) \cdot \sin(I(u, n)) - \right.$$
$$\left. j \cdot X(2u) \cdot \cos(I(u, n)) + X(2u) \cdot \sin(I(u, n)) \right]$$

for $0 \leq n < Q$ and $0 \leq p < P$;

where X represents the real-valued transform coefficients;

$$R = \frac{M}{P};$$
$$I(s, n) = \frac{\pi(8s \cdot (1 + 4n) + 1)}{4N};$$
$$v = P \cdot r + p;$$
$$u = \frac{N}{4} - M + (P \cdot r + p);$$

and
r is an index used in calculations.

11. The audio signal processing device of claim 7, wherein the first transform is equivalent to performing calculations expressed as $$U_R(n, p) = \sum_{r=0}^{R-1} [X(2v) \cdot \sin(I(v, n)) - X(2M - 2v - 1) \cdot \cos(I(u, n))]$$

and $$U_I(n, p) = \sum_{r=0}^{R-1} [-X(2v) \cdot \cos(I(v, n)) - X(2M - 2v - 1) \cdot \sin(I(u, n))]$$

for $0 \leq n < Q$ and $0 \leq p < P$;

where X represents the real-valued transform coefficients;

$$R = \frac{M}{P};$$
$$I(s, n) = \frac{\pi(8s \cdot (1 + 4n) + 1)}{4N};$$
$$v = P \cdot r + p;$$
$$u = \frac{N}{4} - M + (P \cdot r + p);$$

and
r is an index used in calculations.

12. A non-transitory medium recording a program of instructions that is executable by an audio signal processing device, wherein the program of instructions cause the audio signal processing device to perform a method for decoding an encoded digital audio signal, wherein the method comprises:
receiving, by the audio signal processing device, the encoded digital audio signal;
decoding, by the audio signal processing device, the received encoded digital audio signal to generate a block of real-valued transform coefficients, wherein the block has a quantity K of real-valued transform coefficients of which only a number L of the real-valued transform coefficients represent spectral components of a limited-bandwidth audio signal, ½ L<M<K, and M is a power of two;
transforming, by the audio signal processing device, the block of real-valued transform coefficients to generate a sequence of N real-valued signal samples representing temporal components of the limited-bandwidth audio signal, wherein N=2·K; and
outputting, by the audio signal processing device, the real-valued signal samples representing temporal components of the limited-bandwidth audio signal;
wherein the transforming comprises:
applying, by the audio signal processing device, a first-transform of length R to either the L real-valued transform coefficients representing spectral components of the limited-bandwidth audio signal, or complex-valued coefficients derived from the L real-valued transform coefficients representing spectral components of the limited-bandwidth audio signal, wherein $$R = \frac{M}{P}$$

and P is a power of two;
applying, by the audio signal processing device, a bank of Q second transforms of length P to outputs of the first transform; and
deriving, by the audio signal processing device, the sequence of N real-valued signal samples from outputs of the bank of second transforms.
13. The medium of claim 12, wherein:
each of the second transforms is equivalent to performing calculations expressed as $$x'(n + Q \cdot m) = \sum_{p=0}^{P-1} U(n, p) \cdot (W_P)^{p \cdot m}$$

for $0 \leq n < Q$ and $0 \leq m < P$;

the sequence of real-valued signal samples is derived from the outputs of the bank of second transforms by performing calculations equivalent to $$y(n) = (\text{Re}[x'(n)] + j \cdot \text{Im}[x'(n)]) \cdot \left( -\cos\left(\frac{2\pi(8n + 1)}{8N}\right) - j \cdot \sin\left(\frac{2\pi(8n + 1)}{8N}\right) \right);$$

where x' represents the outputs of the second transform;
U(n,p)=a kernel function of the first transform;

$$W_P = e^{j \left(\frac{2\pi}{P}\right)};$$

y(n) represents intermediate signal samples;
Re[x'(n)]=real part of x'(n);
Im[x'(n)]=imaginary part of x'(n);
j=imaginary operator equal to $\sqrt{-1}$; and
m, n and p are indices used in calculations.
14. The medium of claim 12, wherein the first transform is equivalent to performing calculations expressed as $$U(n, p) = \sum_{r=0}^{R-1} \left[ X'(P \cdot r + p) \cdot (W_{N/4})^{(P \cdot r + p) \cdot n} + \right.$$

-continued $$X'\left(\frac{N}{4} - M + (P \cdot r + p)\right) \cdot (W_{N/4})^{\left(\frac{N}{4} - M + (P \cdot r + p)\right) \cdot n}\Bigg] =$$

$$\sum_{r=0}^{R-1} X'(P \cdot r + p) \cdot (W_{N/4})^{(P \cdot r + p) \cdot n} +$$

$$\sum_{r=0}^{R-1} X'\left(\frac{N}{4} - M + (P \cdot r + p)\right) \cdot (W_{N/4})^{\left(\frac{N}{4} - M + (P \cdot r + p)\right) \cdot n}$$

for $0 \leq n < Q$ and $0 \leq p < P$;

where X' represents the complex-valued coefficients;

$$R = \frac{M}{P};$$

and r is an index used in calculations.

15. The medium of claim 12, wherein the first transform is equivalent to performing calculations expressed as $$U(n, p) =$$

$$\sum_{r=0}^{R-1} \left[-X\left(\frac{N}{2} - 2v - 1\right) \cdot \cos(I(v, n)) - j \cdot X\left(\frac{N}{2} - 2v - 1\right) \cdot \sin(I(v, n)) - \right.$$

$$\left. j \cdot X(2v) \cdot \cos(I(v, n)) + X(2v) \cdot \sin(I(v, n))\right] +$$

$$\sum_{r=0}^{R-1} \left[-X\left(\frac{N}{2} - 2u - 1\right) \cdot \cos(I(u, n)) - j \cdot X\left(\frac{N}{2} - 2u - 1\right) \cdot \sin(I(u, n)) - \right.$$

$$\left. j \cdot X(2u) \cdot \cos(I(u, n)) + X(2u) \cdot \sin(I(u, n))\right]$$

for $0 \leq n < Q$ and $0 \leq p < P$;

where X represents the real-valued transform coefficients;

$$R = \frac{M}{P};$$

$$I(s, n) = \frac{\pi(8s \cdot (1 + 4n) + 1)}{4N};$$

$$v = P \cdot r + p;$$

$$u = \frac{N}{4} - M + (P \cdot r + p);$$

and r is an index used in calculations.

16. The medium of claim 12, wherein the first transform is equivalent to performing calculations expressed as $$U_R(n, p) = \sum_{r=0}^{R-1} [X(2v) \cdot \sin(I(v, n)) - X(2M - 2v - 1) \cdot \cos(I(u, n))]$$

and $$U_I(n, p) = \sum_{r=0}^{R-1} [-X(2v) \cdot \cos(I(v, n)) - X(2M - 2v - 1) \cdot \sin(I(u, n))]$$

for $0 \leq n < Q$ and $0 \leq p < P$;

where X represents the real-valued transform coefficients;

$$R = \frac{M}{P};$$

$$I(s, n) = \frac{\pi(8s \cdot (1 + 4n) + 1)}{4N};$$

$$v = P \cdot r + p;$$

$$u = \frac{N}{4} - M + (P \cdot r + p);$$

and r is an index used in calculations.

* * * * *